US012762080B2

(12) United States Patent
Nelson et al.

(10) Patent No.: US 12,762,080 B2
(45) Date of Patent: Oct. 13, 2026

(54) METHOD AND APPARATUS FOR EXTENDING I3C CAPABILITY ACROSS MULTIPLE PLATFORMS AND DEVICES OVER USB-C CONNECTION

(71) Applicant: Intel Corporation, Santa Clara, CA (US)

(72) Inventors: Aruni P. Nelson, Folsom, CA (US); Rolf Kuehnis, Portland, OR (US); Ashok Mishra, Portland, OR (US)

(73) Assignee: Intel Corporation, Santa Clara, CA (US)

(*) Notice: Subject to any disclaimer, the term of this patent is extended or adjusted under 35 U.S.C. 154(b) by 30 days.

(21) Appl. No.: 17/882,462

(22) Filed: Aug. 5, 2022

(65) Prior Publication Data

US 2022/0374382 A1 Nov. 24, 2022

(51) Int. Cl.
*G06F 13/40* (2006.01)
*G06F 11/263* (2006.01)
*G06F 13/42* (2006.01)

(52) U.S. Cl.
CPC ........ *G06F 13/4068* (2013.01); *G06F 11/263* (2013.01)

(58) Field of Classification Search
CPC ............... G06F 11/263; G06F 13/4022; G06F 13/4068; G06F 13/4282
USPC .......................................................... 710/305
See application file for complete search history.

(56) References Cited

U.S. PATENT DOCUMENTS

| | | | | |
|---|---|---|---|---|
| 2016/0217093 | A1* | 7/2016 | Whittington | G06F 13/4282 |
| 2019/0235890 | A1* | 8/2019 | Schnoor | G06F 13/4068 |
| 2021/0318975 | A1* | 10/2021 | Nelson | G06F 13/4291 |
| 2022/0129398 | A1* | 4/2022 | Benjamini | G06F 13/20 |

FOREIGN PATENT DOCUMENTS

EP 4318253 A1 2/2024

OTHER PUBLICATIONS

Extended European Search Report for application No. 23183672.7, issued Dec. 8, 2023, 9 pages.

Mishra et al., "Universal Solution to Sideband Proliferation Using MIPI Virtual GPIO Interface," Oct. 5, 2016, 36 pages.

Framework, "Introducing the new and upgraded Framework Laptop," downloaded from "https://frame.work," on Aug. 5, 2022, 14 pages.

(Continued)

*Primary Examiner* — Chun Kuan Lee
(74) *Attorney, Agent, or Firm* — Banner & Witcoff, Ltd.

(57) ABSTRACT

Methods and apparatus relating to techniques for extending I3C capability across multiple platforms and devices over a Universal Serial Bus (USB) type C (USB-C) connection are described. In one embodiment, a first device is coupled to a second device via a first interface and a second interface. The first interface is to communicate low-speed messages and data between the first device and the second device and the second interface is to communicate high-speed data between the first device and the second device. The first device comprises an extension controller to communicatively couple one or more target devices of the first device to one or more target devices of the second device via the first interface. Other embodiments are also claimed and disclosed.

25 Claims, 8 Drawing Sheets

(56) References Cited

OTHER PUBLICATIONS

Prodigy Technovations, "I3C vs I2C Protocol Analyzer," downloaded from "https://prodigytechno.com/i3c-vs-i2c-protocol-analyzer/" on Jul. 27, 2022, 6 pages.
Wikipedia—Phase-Sift Keying, downloaded from "https://en.wikipedia.org/wiki/Phase-shift_keying" on Aug. 5, 2022, 17 pages.

* cited by examiner

METHOD AND APPARATUS FOR EXTENDING I3C CAPABILITY ACROSS MULTIPLE PLATFORMS AND DEVICES OVER USB-C CONNECTION

FIELD

The present disclosure generally relates to the field of electronics. More particularly, an embodiment relates to techniques for extending I3C capability across multiple platforms and devices over a Universal Serial Bus (USB) type C (USB-C) connection.

BACKGROUND

I3C interface or Improved Inter-Integrated Circuit interface (also known as a SenseWire™ interface) refers to an interface in accordance with a specification to enable communication between computer chips by defining the electrical connection between the chips and signaling patterns to be used (provided by the Mobile and Mobile-Influenced (MIPI) Alliance trade association).

Moreover, I3C is an improved version of Inter-Integrated Circuit (I2C) and provides backward compatibility with I2C. For example, I3C is capable of supporting a Single Data Rate (SDR) mode and a High Data rate (HDR) mode, through which it can currently support up to a 25 Megabits per second (Mbps) data rate with single I3C data lane, whereas a I2C network may support up to approximately 1 Mbps.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
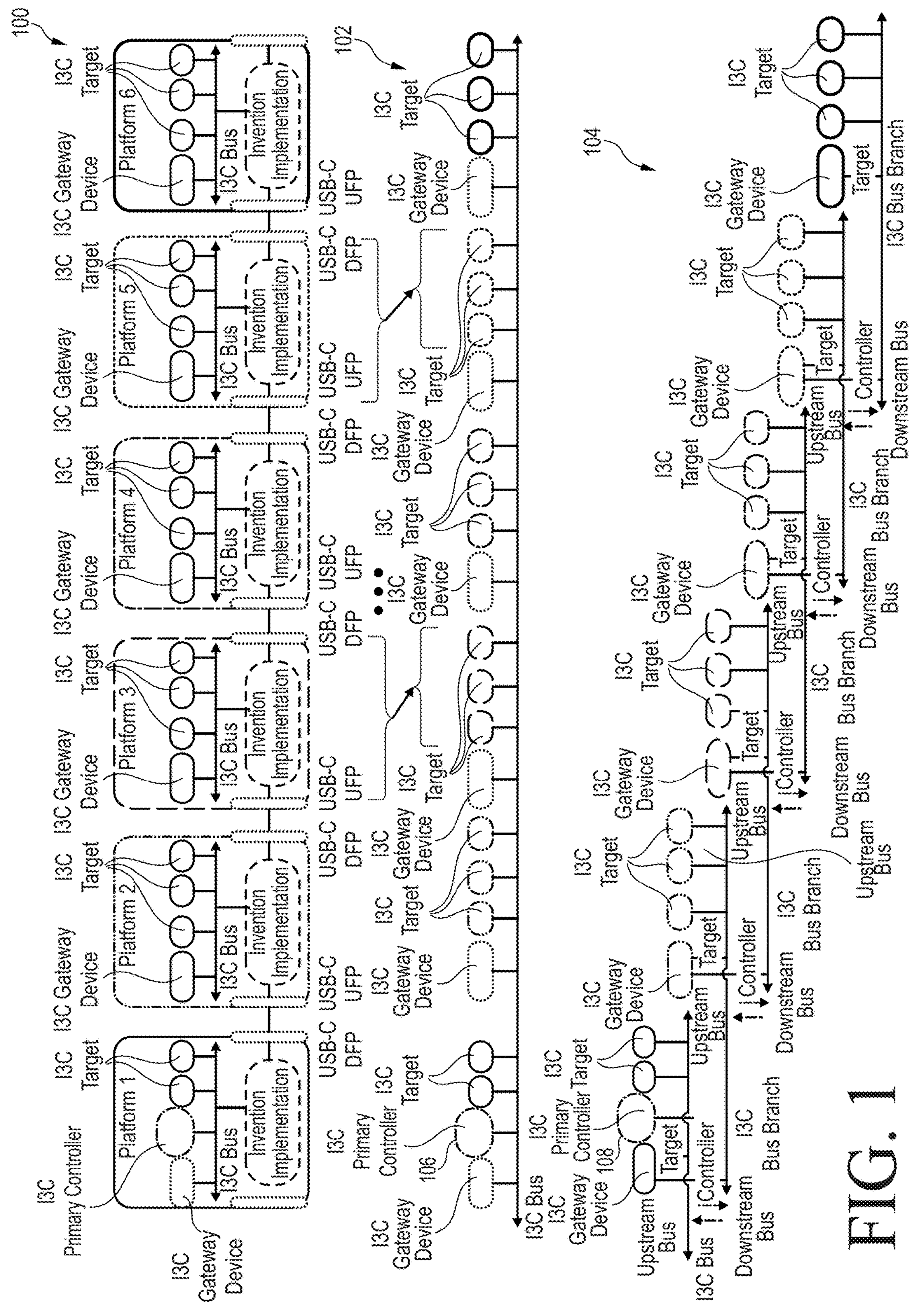
FIG. 1 illustrates a high-level topology for coupling platforms and/or devices in accordance with an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, I3C is an improved version of Inter-Integrated Circuit (I2C) and provides backward compatibility with I2C. For example, I3C is capable of supporting a Single Data Rate (SDR) mode and a High Data rate (HDR) mode, through which it can currently support up to a 25 Megabits per second (Mbps) data rate with single I3C data lane, whereas a I2C network may support up to approximately 1 Mbps. I3C can provide a relatively simple connection solution, e.g., via a 2-pin, low-power, and multi-drop bus.

Furthermore, current implementations may support accessibility to I3C target devices which are either on the same platform (e.g., the target system in case of a debug use-case) or in the same device (such as an Augmented Reality (AR) or a Virtual Reality (VR) headset with I3C target device(s)) connected directly to a host system containing an I3C primary controller. However, current implementations fail to provide a way to extend the accessibility of I3C target devices which may be residing on completely different platform or device. For example, current debug solutions may have the Target System (TS) or targets under debug in a platform, controlled/debugged by a Debug Test System (DTS), where a direct connection between the DTS and TS is required with an Input/Output ("IO" or "I/O") cable or a debug probe (containing a Debug and Test Controller (DTC) such as an I3C controller) coupled in between, or may not have a mechanism which allows extending debug capability across multiple target systems using a single DTS and DTC setup.

Accordingly, current solutions are incapable of providing: (1) a mechanism to connect multiple platforms or devices, e.g., in a chained fashion to extend the I3C bus and hence access the functionality offered by the I3C target devices in other platforms or devices; and/or (2) in use-cases where the I3C controller is external to the platform or device (such as a debug probe), a direct connection between the I3C controller and the platform/device with I3C target devices is needed which increases costs.

To this end, some embodiments provide techniques for extending I3C capability across multiple platforms and devices over a Universal Serial Bus (USB) type C (USB-C) connection. As a result, an I3C bus and functionality may be extended across multiple platforms and/or devices. In an embodiment, the multiple platforms and/or devices may be coupled in series (e.g., in a daisy-chained fashion) over USB-C. As discussed herein, an "I3C" interface generally refers to a multi-drop (i.e., multiple targets with a single controller on the bus), two wire, and/or low-power signaling interface. Hence, embodiments are not limited to I3C and any interface with the aforementioned characteristics may be used in various embodiments.

One or more of the embodiments may provide one or more of the following: (1) extend the I3C bus and its capabilities across multiple platforms and/or devices (e.g., coupled in series); and (2) flexible and low-cost solution to extend the I3C capabilities without having the need for a direct connection between a I3C controller and a platform/device with I3C targets.

Moreover, the extended I3C bus may support use-cases including volume debug and validation over I3C bus. At least one embodiment allows extending I3C functionalities such as sensing, telemetry, etc., over lower bandwidth, low power Side Band Use (SBU) lines of a USB-C connection, while complementing existing functionalities (e.g., USB4 tunneling, Thunderbolt™ (TBT), display, etc.) supported over higher bandwidth, high power, superspeed Transmit/Receive (Tx/Rx) lines of a USB-C connection. Also, the flexibility/low cost may support reduced cost volume debug and test solutions and/or allowing debug of, for example, up to five target systems (as limited by USB4 maximum allowed hops) by a single DTS and DTC setup.

FIG. 1 illustrates a high-level topology 100 for coupling platforms and/or devices in accordance with an embodiment. As shown in FIG. 1, each platform includes an I3C gateway device and one or more I3C targets that are coupled with I3C extension logic circuitry via an I3C bus. The I3C extension logic circuitry blocks may communicate with each other (e.g., in a daisy-chain/serial fashion) via USB-C Downstream Facing Ports (DFPs) and USB-C Upstream Facing Ports (UFPs).

In one embodiment, a USB-C connector configuration channel (CC) is utilized to determine the connection of a downstream platform which is capable of supporting extended I3C capabilities. In another embodiment, a USB-C connector sideband use (SBU) line(s) are used to transmit I3C related commands, messages, and/or data.

Furthermore, FIG. 1 illustrates two topologies of I3C bus (labeled as 102 and 104 in FIG. 1) as follows:

(1) in topology 102, the I3C primary controller 106 has direct access and visibility to all I3C targets residing in serially connected platforms/device, as if all the targets existed on a single I3C bus (e.g., with the I3C gateway device acting as a passthrough device); and (2) in topology 104, the I3C bus is branched, where the I3C gateway devices are configured to act as an I3C target device on the upstream I3C bus and as an I3C controller on the downstream I3C bus.

Moreover, in case of topology 102, the I3C gateway device in each platform appears as a passthrough device for the platforms coupled downstream. The I3C primary controller 106 then ensures all the I3C target devices across all platforms on the I3C Bus are assigned distinct addresses.

In case of topology 104, the I3C gateway device would control the downstream I3C bus and would be responsible for conveying I3C messages and data to/from I3C targets on the downstream bus to the upstream bus. The I3C primary controller 108 then ensures all the I3C target devices on the I3C bus are assigned distinct addresses, while the I3C target devices on its downstream I3C bus may be assigned virtual addresses managed by the I3C gateway device acting as the controller for that I3C bus branch.

Figure 2:
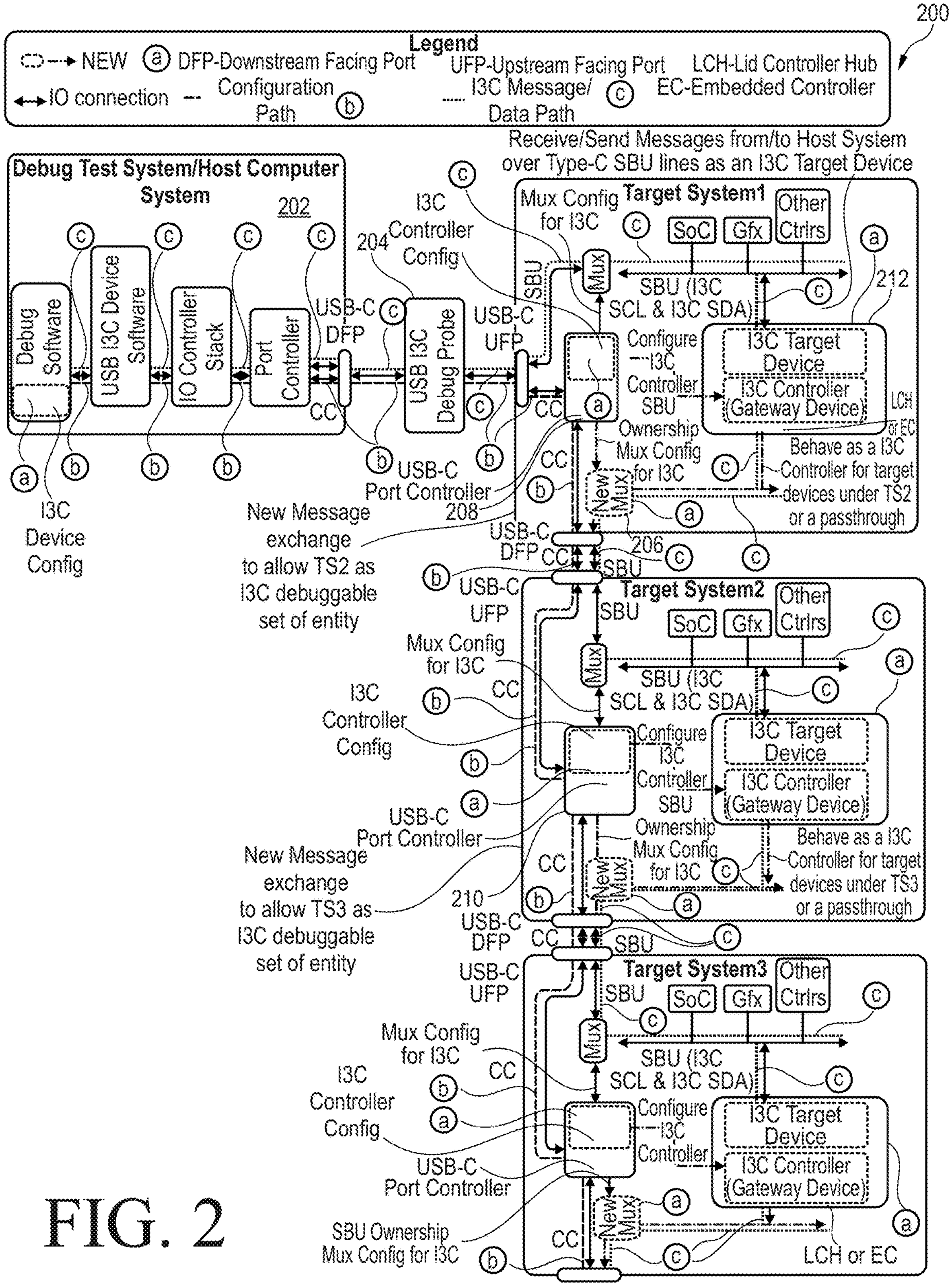
FIG. 2 and FIG. 4 illustrate block diagrams of systems with debug over I3C as an example use-case, according to some embodiments.
Figure 4:
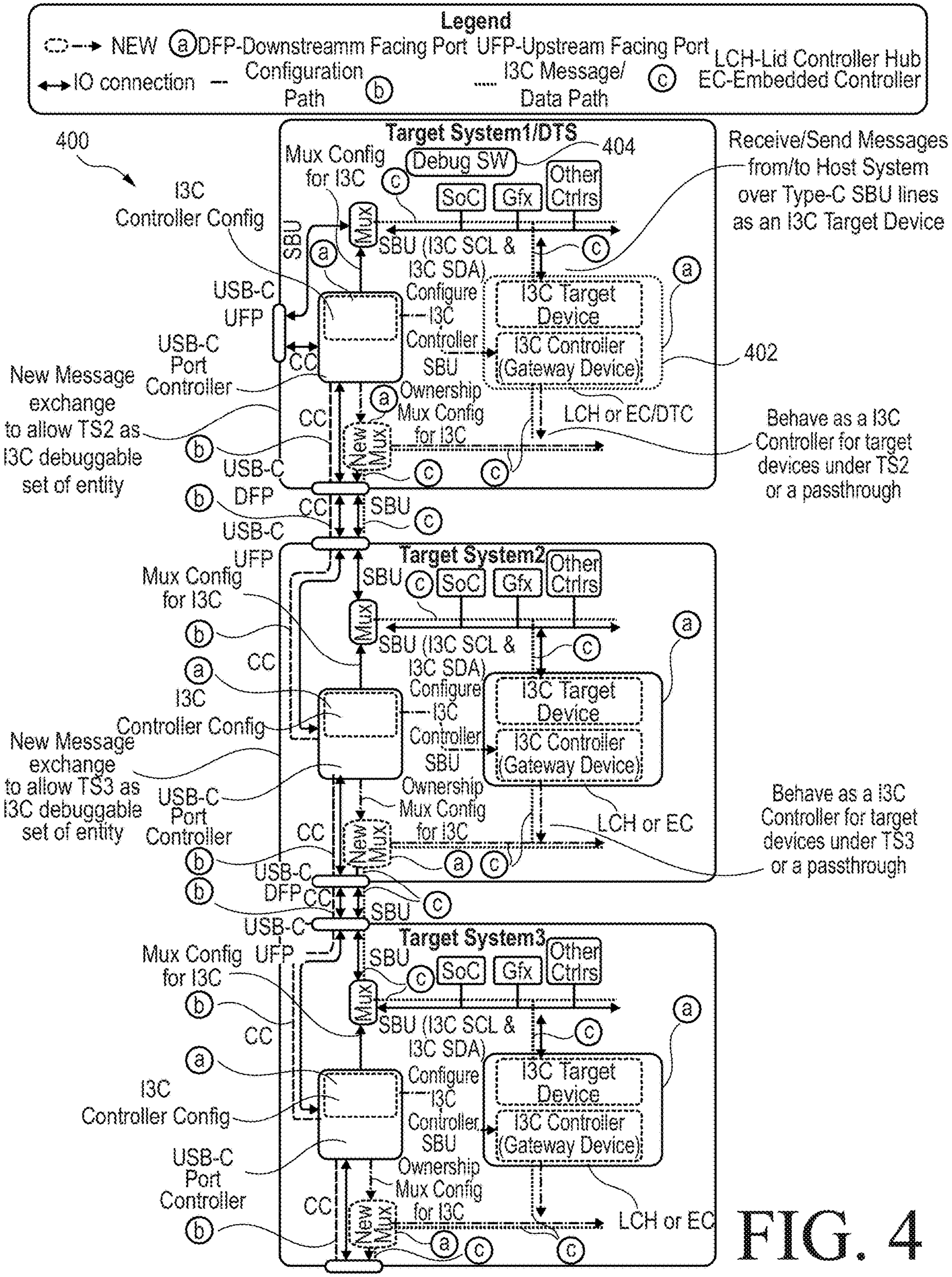

FIG. 2 and FIG. 4 illustrate block diagrams of systems 200 and 400, respectively, with debug over I3C as an example use-case, according to some embodiments. While some embodiments discussed herein are illustrated with reference to USB-C connections, other interconnects may be used in various implementations. In the figures, "GfX" refers to a graphics logic or graphics processor.

More particularly, FIG. 2 illustrates a sample system 200 for a debug over I3C use-case, according to an embodiment. FIG. 2 example topology may be used to provide an extended I3C debug capability use-case with external DTS 202 and DTC (e.g., in a USB I3C debug probe 204, the DTC). Even though only three target systems are shown in FIG. 2, embodiments may be applied to more or fewer target systems.

Figure 3:
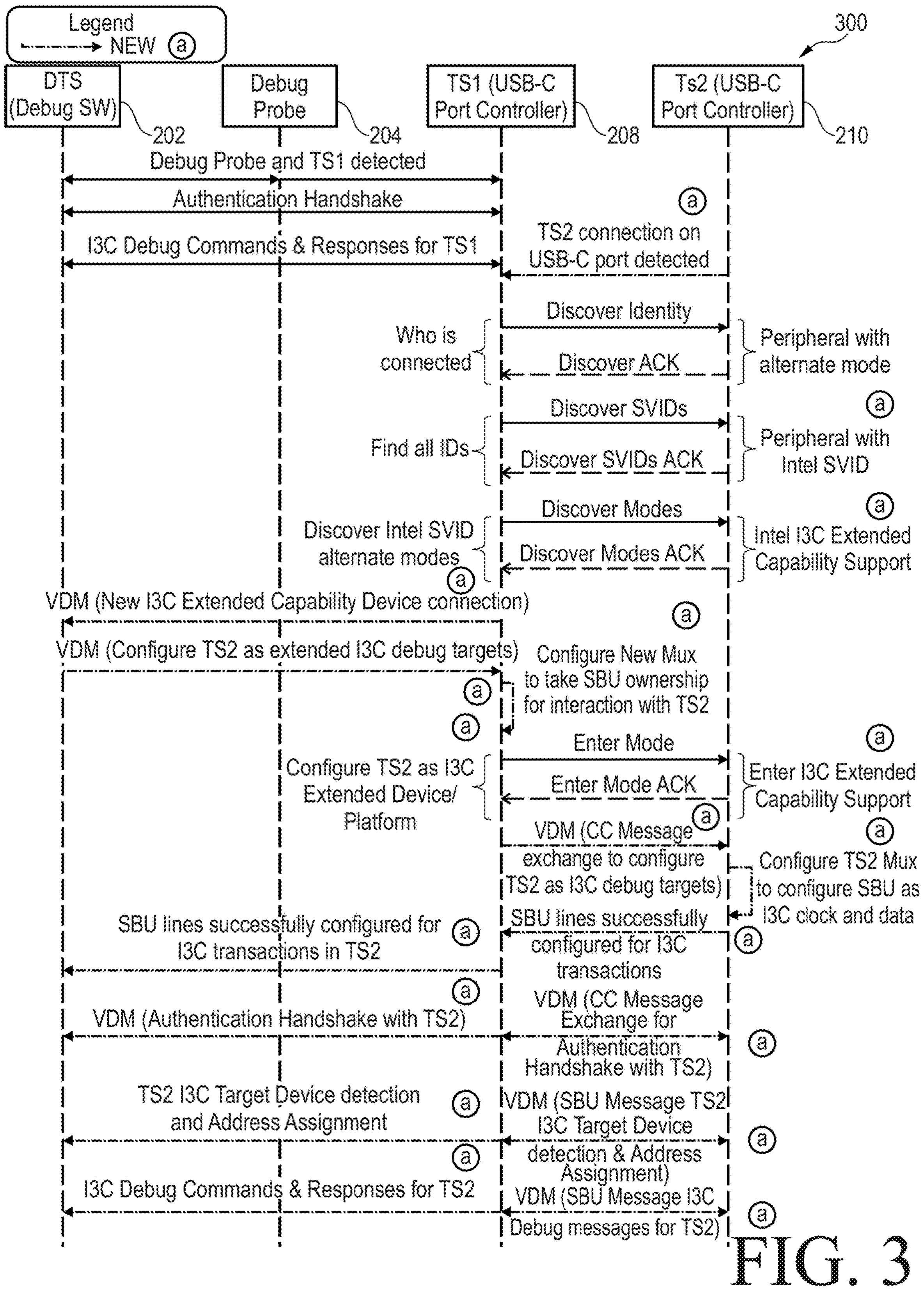
FIG. 3 illustrates a flow diagram for detection, control, configuration. and I3C message and data transmission, according to an embodiment.

FIG. 3 illustrates a flow diagram of a method 300 for detection, control, configuration, and I3C message and data transmission, according to an embodiment. As discussed herein, "SVID" refers to a Standard or Vender Identification, "VDM" refers to a Vendor Defined Message.

Referring to FIGS. 2 and 3, a Target System 1 (TS1) with multiple I3C target devices is connected to (e.g., a DTS of) the I3C debug probe 204. The I3C debug probe hosts the primary I3C controller (such as discussed with reference to FIG. 1). When the TS1 is connected to this DTS via the debug probe containing the I3C primary controller, the DTS detects the debug probe and the TS1. To access and debug all the I3C targets in TS1 via the debug probe, the DTS performs an authentication handshake, and proceeds with I3C commands and responses.

When a Target System 2 (TS2) is connected to a downstream USB-C port (with a New proposed Multiplexer (Mux) 206) of TS1, the USB-C port controllers of TS1 and TS2 exchange messages to determine if TS2 is capable of exposing its I3C target devices for extended I3C capability.

In turn, TS1 informs DTS about the presence of an additional platform (e.g., TS2) with Extended I3C capability feature. If the DTS decides to use TS2, it sends the command to TS1 USB-C port controller 208 to enable TS2 with extended I3C capability.

The USB-C port controller 208 in TS1 configures the SBU lines of its downstream USB-C port over which TS2 is connected to carry I3C clock and data lines, controlled by the I3C primary controller in the debug probe 204. Thereafter, the USB-C port controller 208 in TS1 exchanges messages with port controller 210 in TS2 to configure its SBU lines for I3C clock and data, allowing I3C message and data flow to all the I3C target devices in TS1 and TS2.

Additionally, based on the use-case, an entity such as Lid Controller Hub (LCH) or Embedded Controller (EC), as indicated in FIG. 2 and FIG. 4 (including for example LCH/EC 212 of TS1), may be implemented with either a separate I3C target and a I3C controller or a smart I3C device which can be configured to act as:

(a) A gateway for the I3C target devices in the platform or a device connected on the downstream USB-C port. In this case this I3C Device acts as the I3C controller for the branch of the downstream I3C bus (e.g., as discussed with reference to the topology 104 in FIG. 1).

(b) A passthrough for the I3C target devices in the platform or device coupled on the downstream USB-C port. In this case, this I3C device acts as the passthrough and there is a single I3C primary Controller (for example the I3C primary controller in the debug probe 204 of FIG. 2 and DTC 402 of FIG. 4) and all I3C targets across all platforms/devices connected are accessible and visible on the single I3C bus (e.g., as discussed with reference to the topology 102 of FIG. 1).

In an embodiment, the I3C controller in the debug probe 204 may hand off the I3C controller role to the I3C device/controller in the LCH/EC 212 in response to a request/command from the DTS 202. Furthermore, the extended I3C capabilities discussed with reference to FIGS. 2 and 3 may be applied beyond just two target systems TS1 and TS2 coupled in series to additional platforms/devices.

While some embodiments have been illustrated with reference to a debug over I3C use-case, embodiments are not limited to this single use case and may be used to extend the capabilities of a platform by utilizing the features offered by I3C target devices in other platforms such as:

(a) sensing related expansion (see, e.g., FIG. 5) of computing devices including use-cases of a modular Personal Computer (PC)/laptop;

(b) since USB-C SBU are low power, one or more embodiments may be used for low-power telemetry data collection over an I3C bus (USB-C SBU) from multiple coupled platforms (e.g., in series); and/or (c) serial port extension across multiple platforms.

Referring to FIGS. 2-3, if TS1 has an I3C gateway device acting as a passthrough (also refer to the topology 102 of FIG. 1), I3C target devices on the downstream I3C bus in TS2 may send any message/data on the SBU lines which will translate to I3C message/data in the upstream I3C bus of TS1. I3C messages/data received on the upstream I3C bus of TS1 are then sent over SBU lines to the debug probe 204 and to the DTS over USB.

Also, if TS1 has an I3C gateway device acting as a gateway/controller (also refer to the topology 104 of FIG. 1), for I3C target devices in TS2, this I3C gateway device may receive the I3C messages/data received from TS2 I3C target devices and send it on the TS1's I3C bus/upstream I3C bus as if it were an I3C target device on the upstream I3C bus.

FIG. 4 illustrates another sample system 400 for a debug over I3C use-case, according to an embodiment. In the example of system 400, the system topology for an extended I3C debug capability use-case with TS1 as DTS and DTC are shown. In the implementation of FIG. 4, the I3C primary controller is in a platform/device, such as a DTC 402 for debug in TS1 and platforms/devices coupled (e.g., in series) to TS1 may be configured for extended I3C capabilities.

As shown in FIG. 4, rather than a separate DTS 202 (as discussed with reference to FIG. 2), a debug software (SW) 404 may run in TS1 (configured as DTS) and the LCH/EC 402 then is configured to function as a DTC. Hence, in one or more embodiments, the DTS 202 (or its debug software), debug software 404, and/or another logic/device (e.g., a host system/computer with a primary I3C controller) may configure one or more extension controllers discussed herein.

Figure 5:
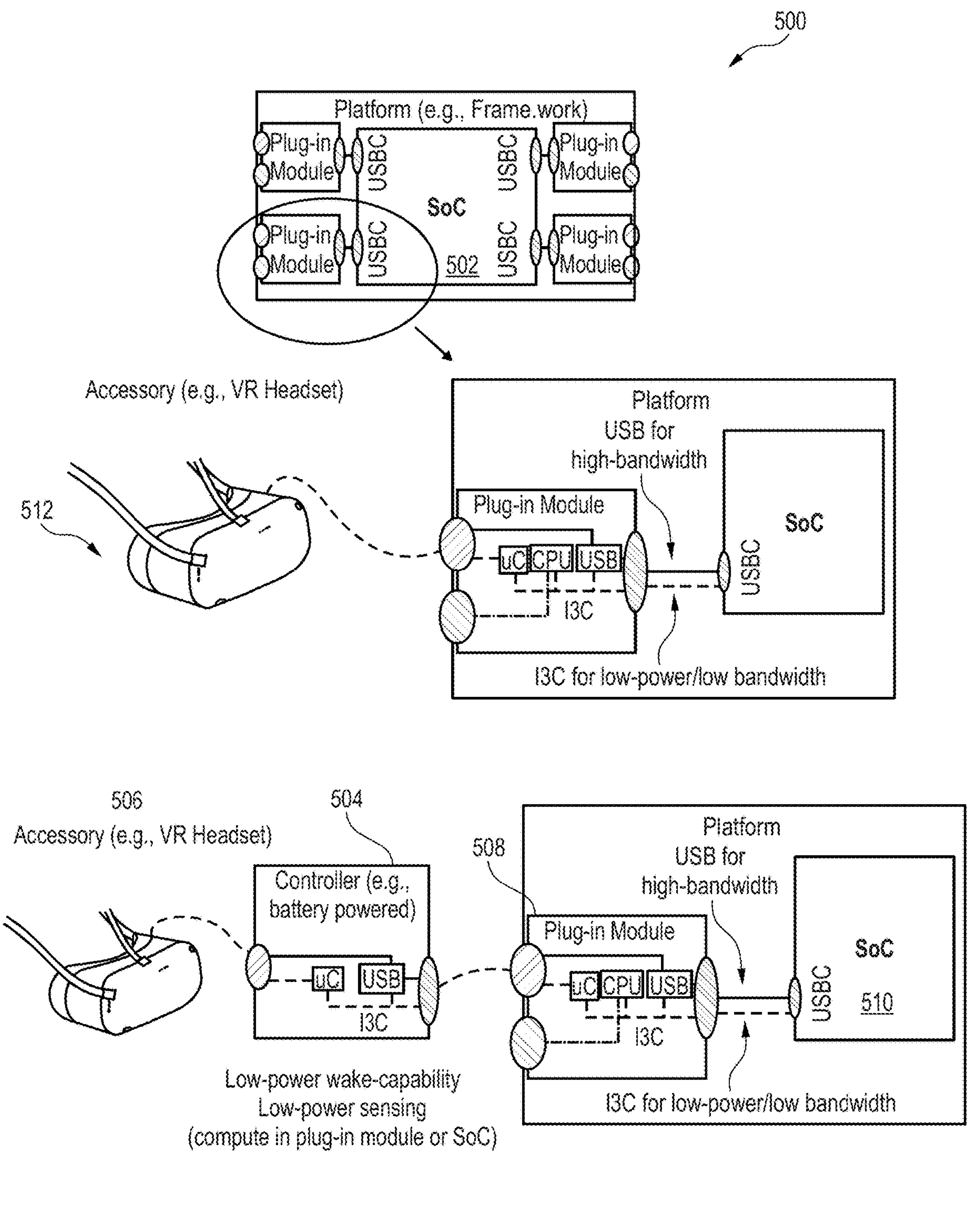
FIG. 5 illustrates a usage example for a modular computing device, according to an embodiment.

Furthermore, with reference to sensing related expansion and modular PC/laptop like use-cases, FIG. 5 illustrates a usage example 500, according to an embodiment. Moreover, FIG. 5 shows a conceptual drawing of a modular laptop, which allows an easy user configuration. Different modules (called expansion cards) may be inserted into the chassis, providing different functions such as a USB type A (USB-A), USB-C, Display Port (DP), High Definition Multimedia Interface (HDMI) port, storage, a Secure Digital (SD) card reader, etc. These modules (labeled as "plug-in module" in FIG. 5) may be connected over USB-C to a main System on Chip ("SoC" or "SOC") 502. In order to reduce the power consumption, I3C may be used for base communication with the modules and through it to the attached device(s). No USB high power, superspeed Transmit/Receive (Tx/Rx) physical power will be needed for low-bandwidth sensor use-cases (e.g., user presence (such as AR or VR), basic user input, etc.).

As shown on the bottom of FIG. 5, an optional controller 504 (e.g., battery powered) may be coupled between an accessory (e.g., a VR/AR headset) 506 and the plug-in module 508 of an SoC 510. The controller 504 may provide low-power wake detection capability, whereas computing functions may be performed by logic circuitry in the plug-in module 508 (such as a microcontroller (uc), a Central Processing Unit (CPU) or processor, a USB controller, etc.). However, as shown in FIG. 5 (middle section example 512), a controller 504 is not necessary in all implementations.

Accordingly, some embodiments utilize one or more of:

(1) a dedicated multiplexer (e.g., mux 206 of FIG. 2) used for downstream facing USB-C port over which the I3C capability of the device/platform connected can be extended (where this mux may be configured to ensure USB-C connection's Sideband Use (SBU) lines carry I3C clock and data between the two coupled platforms/devices);

(2) new logic in a USB-C port controller of platform to detect and configure a platform/device to extend the I3C capability (such as the controller 208 of FIG. 2);

(3) a new VDM (e.g., a USB Power Delivery (PD) message) exchange between the USB-C port controllers of two platforms/devices coupled over a USB-C connection to configure an extend I3C capability (see, e.g., the flow of FIG. 3);

(4) a new VDM from an application (requesting extended I3C capability) targeted to the USB-C port controller controlling the "New Mux" to initiate configuration and message exchange with platform/device coupled to the downstream facing USB-C port (see, e.g., the flow of FIG. 3 and the debug software in DTS 202 of FIG. 2 and/or debug software 404 of FIG. 4);

(5) new logic in a platform component with I3C controller (such as LCH EC) which could be configured as either a gateway or a passthrough to downstream I3C target devices (see, e.g., FIGS. 2 and/or 4); and/or (6) a new software implementation to take action based on application needs to trigger configuration of platforms/devices for extended I3C capability (such as the debug software 404 of FIG. 4).

Figure 6:
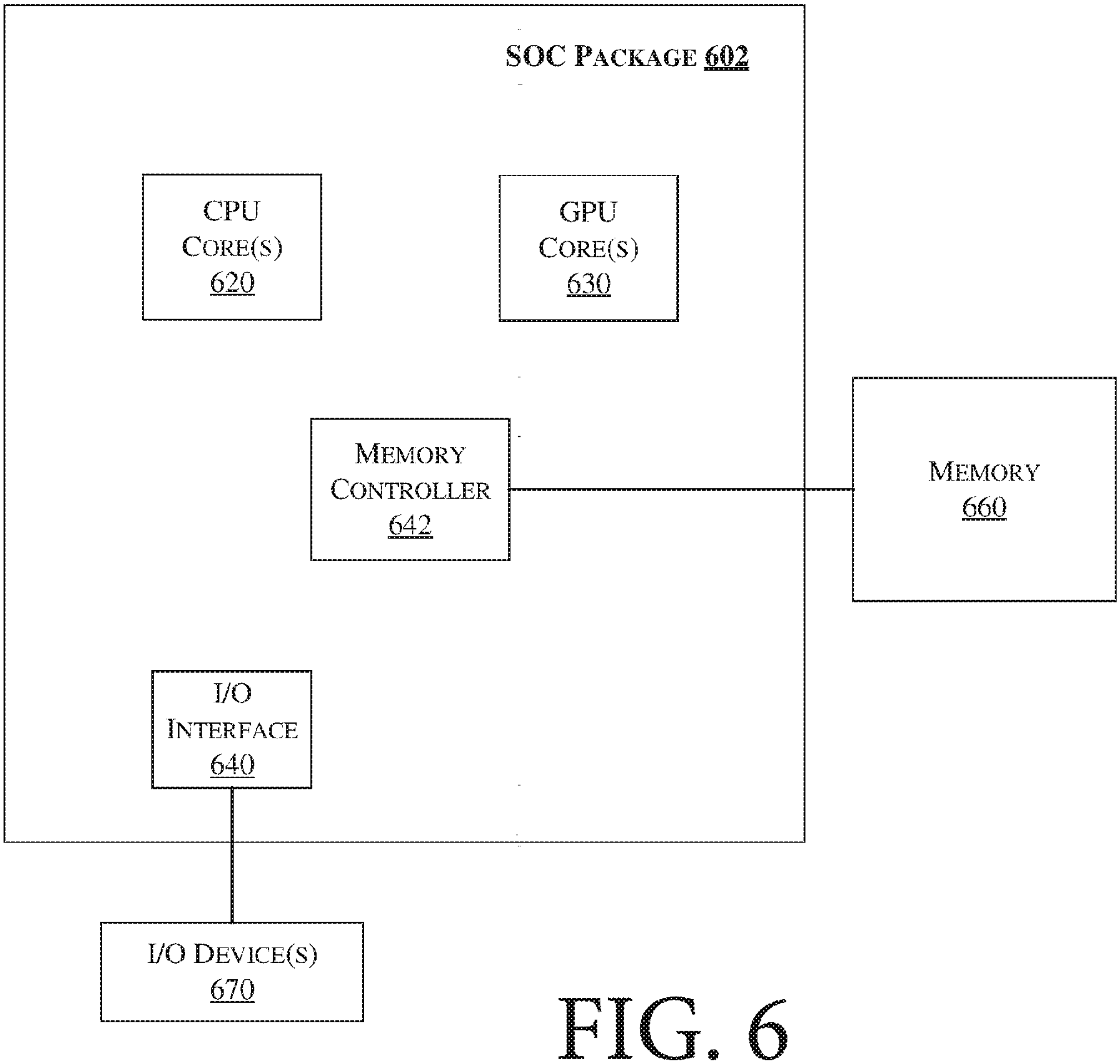
FIG. 6 illustrates a block diagram of an embodiment of a computing system, which may be utilized in various embodiments discussed herein.

One or more components discussed with reference to FIGS. 6-8 (including but not limited to I/O devices, memory/storage devices, graphics/processing cards/devices, network/bus/audio/display/graphics controllers, wireless transceivers, etc.) may be coupled using the extended I3C capability across multiple platforms and devices (e.g., over a USB-C connection) as discussed above. More particularly, FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like.

Figure 7:
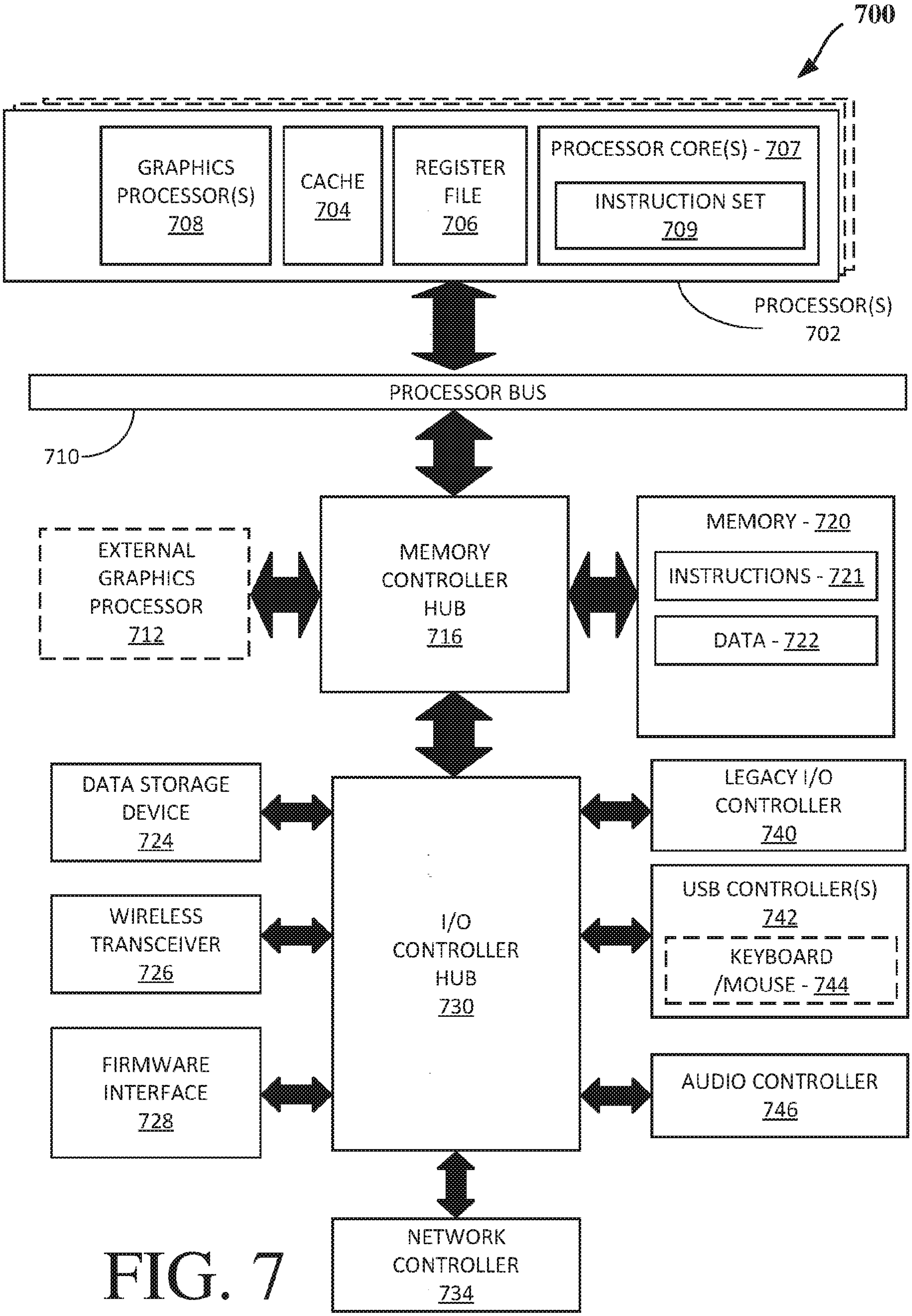
FIG. 7 illustrates a block diagram of an embodiment of a computing system, which may be utilized in various embodiments discussed herein.

FIG. 7 is a block diagram of a processing system 700, according to an embodiment. In various embodiments the system 700 includes one or more processors 702 and one or more graphics processors 708, and may be a single processor desktop system, a multiprocessor workstation system, or a server system having a large number of processors 702 or processor cores 707. In an embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random access memory (DRAM) device, a static random access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

Figure 8:
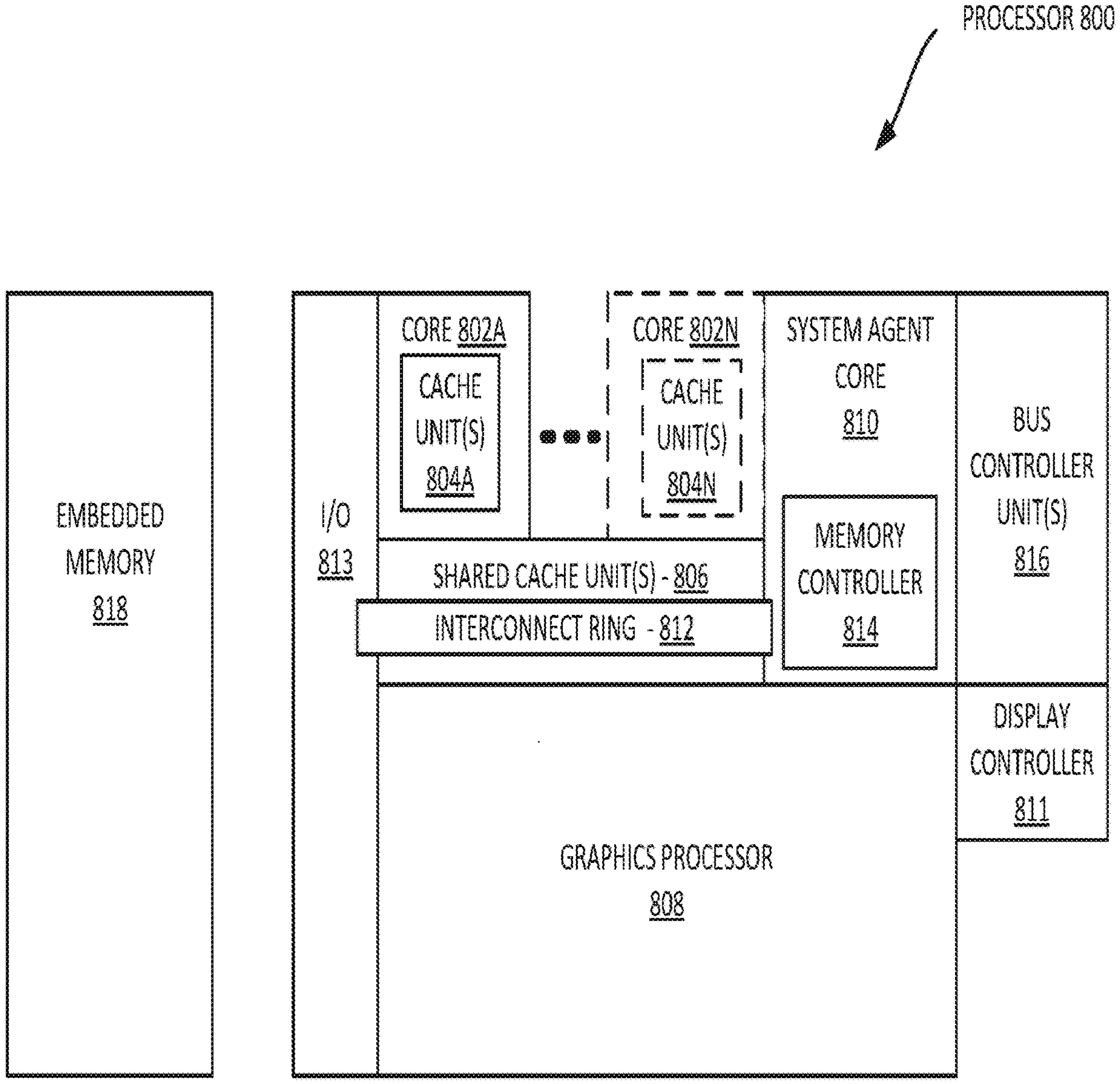
FIG. 8 illustrates various components of a processer in accordance with some embodiments.

FIG. 8 is a block diagram of an embodiment of a processor 800 having one or more processor cores 802A to 802N, an integrated memory controller 814, and an integrated graphics processor 808. Those elements of FIG. 8 having the same reference numbers (or names) as the elements of any other figure herein can operate or function in any manner similar to that described elsewhere herein, but are not limited to such. Processor 800 can include additional cores up to and including additional core 802N represented by the dashed lined boxes. Each of processor cores 802A to 802N includes one or more internal cache units 804A to 804N. In some embodiments each processor core also has access to one or more shared cached units 806.

The internal cache units 804A to 804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A to 804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A to 802N include support for simultaneous multi-threading. In such embodiment, the system agent core 810 includes components for coordinating and operating cores 802A to 802N during multi-threaded processing. System agent core 810 may additionally include a power control unit (PCU), which includes logic and components to regulate the power state of processor cores 802A to 802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect, or may be integrated within the graphics processor 808 or system agent core 810.

In some embodiments, a ring-based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802 to 802N and graphics processor 808 use embedded memory modules 818 as a shared Last Level Cache.

In some embodiments, processor cores 802A to 802N are homogenous cores executing the same instruction set architecture. In another embodiment, processor cores 802A to 802N are heterogeneous in terms of instruction set architecture (ISA), where one or more of processor cores 802A to 802N execute a first instruction set, while at least one of the other cores executes a subset of the first instruction set or a different instruction set. In one embodiment processor cores 802A to 802N are heterogeneous in terms of micro-architecture, where one or more cores having a relatively higher power consumption couple with one or more power cores having a lower power consumption. Additionally, processor 800 can be implemented on one or more chips or as an SoC integrated circuit having the illustrated components, in addition to other components.

The following examples pertain to further embodiments. Example 1 includes an apparatus comprising: a first device coupled to a second device via a first interface and a second interface; the first interface to communicate low-speed messages and data between the first device and the second device; the second interface to communicate high-speed data between the first device and the second device, wherein the first device comprises an extension controller to communicatively couple one or more target devices of the first device to one or more target devices of the second device via the first interface. Example 2 includes the apparatus of example 1, wherein a first gateway device of the first device and a second gateway device of the second device are to pass-through all messages and data over the first interface to allow the extension controller to communicatively couple all target devices of the first device to all target devices of the second device via the first interface.

Example 3 includes the apparatus of example 1, wherein a first gateway device of the first device and a second gateway device of the second device are to act as a target device on an upstream bus and as a controller on a downstream bus to allow the extension controller to communicatively couple the one or more target devices of the first device to the one or more target devices of the second device via the first interface. Example 4 includes the apparatus of example 1, wherein the first device or the second device comprise a multiplexer, coupled to a downstream facing port of the second interface to allow for Sideband Use (SBU) lines of the second interface to carry clock and data between the first device and second device for the first interface. Example 5 includes the apparatus of example 1, wherein logic in a port controller of the second interface is to detect and configure one of the first device or the second device to extend at least one capability associated with the first interface. Example 6 includes the apparatus of example 1, wherein a message exchange between port controllers of the second interface in the first device and the second device is to cause configuration of an extended capability for the first interface. Example 7 includes the apparatus of example 1, wherein a message from an application is to initiate configuration and message exchange with a device coupled to a downstream facing port of the first device or the second device. Example 8 includes the apparatus of example 7, wherein the first device or the second device comprise a multiplexer, wherein the message is targeted to control the multiplexer to initiate the configuration and the message exchange. Example 9 includes the apparatus of example 1, further comprising a Debug Test System (DTS) coupled to the first device, wherein the DTS comprises logic to cause configuration of the extension controller. Example 10 includes the apparatus of example 1, comprising logic, coupled to a controller of the first interface, to cause configuration of the extension controller. Example 11 includes the apparatus of example 1, wherein the first device comprises debug logic to configure the first device as a DTS. Example 12 includes the apparatus of example 1, wherein the first device comprises a System on Chip (SoC) and at least one plug-in module, coupled to the SoC, wherein the accessory is to communicate with the SoC via the plug-in module.

Example 13 includes the apparatus of example 12, wherein the plug-in module is coupled to the SoC via the first interface and/or the second interface. Example 14 includes the apparatus of example 12, wherein the accessory comprises a Virtual Reality (VR) or Augmented Reality (AR) headset. Example 15 includes the apparatus of example 12, further comprising a controller, coupled between the accessary and the plug-in module, to detect a wake event. Example 16 includes the apparatus of example 15, wherein the controller is battery powered. Example 17 includes the apparatus of example 1, wherein the first interface is to operate at a lower speed than the second interface. Example 18 includes the apparatus of example 1, wherein the first interface is to consume less power than the second interface. Example 19 includes the apparatus of example 1, wherein the first interface comprises an Improved Inter-Integrated Circuit (I3C) interface. Example 20 includes the apparatus of example 1, wherein the second interface comprises a Universal Serial Bus (USB). Example 21 includes the apparatus of example 20, wherein the USB comprises one of a USB type A (USB-A) and a USB type C (USB-C). Example 22 includes the apparatus of example 1, wherein the one or more target devices of the first device and/or the second device are capable to communicate with each other via an I3C bus.

Example 23 includes a system comprising: a processor coupled to a storage device; a first interface and a second interface to couple a first device and a second device; the first interface to communicate low-speed messages and data between the first device and the second device; the second interface to communicate high-speed data between the first device and the second device, wherein the first device comprises an extension controller to communicatively couple one or more target devices of the first device to one or more target devices of the second device via the first interface. Example 24 includes the system of example 23, wherein a first gateway device of the first device and a second gateway device of the second device are to pass-through all messages and data over the first interface to allow the extension controller to communicatively couple all target devices of the first device to all target devices of the second device via the first interface. Example 25 includes the system of example 23, wherein a first gateway device of the first device and a second gateway device of the second device are to act as a target device on an upstream bus and as a controller on a downstream bus to allow the extension controller to communicatively couple the one or more target devices of the first device to the one or more target devices of the second device via the first interface.

Example 26 includes an apparatus comprising means to perform a method as set forth in any preceding claim. Example 27 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:

a first device coupled to a second device via a first interface and a second interface, the first interface comprising an Improved Inter-Integrated Circuit (I3C) interface, wherein:

the first interface is configured to communicate low-speed messages and low-speed data between the first device and the second device, the second interface is configured to communicate high-speed data between the first device and the second device, and the first device comprises an extension controller configured to communicatively couple one or more I3C target devices of the first device and one or more I3C target devices of the second device via the first interface, the first device comprises a primary I3C controller that is separate from the extension controller, and the extension controller facilitates an extension of a first device I3C bus and a second device I3C bus to enable the primary I3C controller to directly access the one or more I3C target devices in the first device and the one or more I3C target devices in the second device as a single I3C bus, and a first gateway device of the first device, the first gateway device configured to appear as a passthrough device to a second gateway device of the second device over the first interface to facilitate the primary I3C controller assigning distinct addresses to the one or more I3C target devices of the first device and the one or more I3C target devices of the second device on the single I3C bus.

2. The apparatus of claim 1, wherein the first gateway device of the first device and the second gateway device of the second device are configured to act (i) as a I3C target device on an upstream bus, and (ii) as a controller on a downstream bus.

3. The apparatus of claim 1, wherein the first device or the second device comprises a multiplexer, which is coupled to a downstream facing port of the second interface to enable Sideband Use (SBU) lines of the second interface to carry clock and data information between the first device and second device for operation of the first interface.

4. The apparatus of claim 1, wherein the second interface comprises a port controller including logic configured to detect and configure one of the first device or the second device to extend at least one capability associated with the first interface.

5. The apparatus of claim 1, wherein:

the second interface of the first device comprises a first port controller, the second interface of the second device comprises a second port controller, and the first port controller and the second port controller are configured to perform a message exchange to cause a configuration of an extended capability for the first interface.

6. The apparatus of claim 1, wherein a message from an application is configured to initiate configuration and message exchange with a device coupled to a downstream facing port of the first device or the second device.

7. The apparatus of claim 6, wherein the first device or the second device comprises a multiplexer, and wherein the message is configured to control the multiplexer to initiate the configuration and the message exchange.

8. The apparatus of claim 1, further comprising:

a Debug Test System (DTS) coupled to the first device, wherein the DTS comprises logic configured to cause configuration of the extension controller.

9. The apparatus of claim 1, further comprising:

logic coupled to a controller of the first interface and configured to cause configuration of the extension controller.

10. The apparatus of claim 1, wherein the first device comprises debug logic configured to configure the first device as a DTS.

11. The apparatus of claim 1, wherein the first device comprises a System on Chip (SoC) and at least one plug-in module coupled to the SoC, and wherein an accessory device is configured to communicate with the SoC via the plug-in module.

12. The apparatus of claim 11, wherein the plug-in module is coupled to the SoC via the first interface and/or the second interface.

13. The apparatus of claim 11, wherein the accessory comprises a Virtual Reality (VR) or Augmented Reality (AR) headset.

14. The apparatus of claim 11, further comprising:

a controller coupled between the accessory device and the plug-in module, the controller being configured to detect a wake event.

15. The apparatus of claim 14, wherein the controller is battery powered.

16. The apparatus of claim 1, wherein the first interface is configured to operate at a lower speed than the second interface.

17. The apparatus of claim 1, wherein the first interface is configured to consume less power than the second interface.

18. The apparatus of claim 1, wherein the second interface comprises a Universal Serial Bus (USB) interface.

19. The apparatus of claim 18, wherein the USB interface comprises a USB type A (USB-A) interface or a USB type C (USB-C) interface.

20. The apparatus of claim 1, wherein the first device and the second device comprise separate platforms coupled in a daisy-chain configuration.

21. The apparatus of claim 20, wherein the extension controller enables the one or more I3C target devices of the first device to communicate with the one or more I3C target devices of the second device as if residing on a single I3C bus spanning the separate platforms.

22. The apparatus of claim 1, wherein the first gateway device appears as the passthrough device for the second device such that all I3C target devices across the first device and the second device that are assigned the distinct addresses are accessible and visible to the primary I3C controller on the single I3C bus.

23. The apparatus of claim 1, wherein the second interface of the first device comprises a port controller configured to exchange messages with the second device to determine whether the second device is capable of exposing the one or more I3C target devices of the second device for extended I3C capability via the first interface.

24. A system comprising:

a processor coupled to a storage device;

a first interface and a second interface configured to couple a first device and a second device to one another, the first interface comprising an Improved Inter-Integrated Circuit (I3C ) interface, wherein:

the first interface is configured to communicate low-speed messages and low-speed data between the first device and the second device, the second interface is configured to communicate high-speed data between the first device and the second device, the first device comprises (i) an extension controller configured to communicatively couple one or more I3C target devices of the first device to one or more I3C target devices of the second device via the first interface, and (ii) a primary I3C controller that is separate from the extension controller, and the extension controller facilitates an extension of a first device I3C bus and a second device I3C bus to enable the primary I3C controller to directly access the one or more I3C target devices in the first device and the one or more I3C target devices in the second device as a single I3C bus, and a first gateway device of the first device, the first gateway device configured to appear as a passthrough device to a second gateway device of the second device over the first interface to facilitate the primary I3C controller assigning distinct addresses to the one or more I3C target devices of the first device and the one or more I3C target devices of the second device on the single I3C bus.

25. The system of claim 24, wherein the first gateway device of the first device and the second gateway device of the second device are configured to act (i) as a I3C target device on an upstream bus, and (ii) as a controller on a downstream bus.

* * * * *